(12) United States Patent
Kiyono et al.

(10) Patent No.: US 12,422,741 B2
(45) Date of Patent: Sep. 23, 2025

(54) OPTICAL DETECTOR

(71) Applicant: DENSO CORPORATION, Kariya (JP)

(72) Inventors: Mitsuhiro Kiyono, Kariya (JP); Kenichi Yanai, Kariya (JP); Teiyuu Kimura, Kariya (JP); Noriyuki Ozaki, Kariya (JP); Shinji Kashiwada, Kariya (JP); Fumiaki Mizuno, Kariya (JP); Kazuhisa Onda, Kariya (JP)

(73) Assignee: DENSO CORPORATION, Kariya (JP)

( * ) Notice: Subject to any disclaimer, the term of this patent is extended or adjusted under 35 U.S.C. 154(b) by 1088 days.

(21) Appl. No.: 17/161,434

(22) Filed: Jan. 28, 2021

(65) Prior Publication Data

US 2021/0240066 A1 Aug. 5, 2021

(30) Foreign Application Priority Data

Jan. 31, 2020 (JP) .................................. 2020-015010

(51) Int. Cl.
| | | |
|---|---|---|
| G03B 21/28 | (2006.01) | |
| G01S 7/48 | (2006.01) | |
| G01S 7/481 | (2006.01) | |
| G01S 17/06 | (2006.01) | |
| G02B 26/10 | (2006.01) | |

(52) U.S. Cl.
CPC ............ *G03B 21/28* (2013.01); *G01S 7/4808* (2013.01); *G01S 7/4817* (2013.01); *G01S 17/06* (2013.01); *G02B 26/105* (2013.01)

(58) Field of Classification Search
CPC .................................................... G01S 7/4817
See application file for complete search history.

(56) References Cited

U.S. PATENT DOCUMENTS

| | | | |
|---|---|---|---|
| 9,470,520 B2 | 10/2016 | Schwarz et al. | |
| 10,281,923 B2 | 5/2019 | Boehmke | |
| 2016/0096474 A1* | 4/2016 | Sakai ..................... B60Q 9/008 | |
| | | | 356/5.01 |
| 2016/0274223 A1 | 9/2016 | Mai | |
| 2016/0320472 A1 | 11/2016 | Okushiba | |
| 2017/0097419 A1* | 4/2017 | Murayama ........... G02B 27/144 |
| 2017/0176579 A1* | 6/2017 | Niclass .................. G01S 17/10 |

(Continued)

FOREIGN PATENT DOCUMENTS

| | | |
|---|---|---|
| EP | 2827173 A2 | 1/2015 |
| EP | 3208636 A1 | 8/2017 |

(Continued)

OTHER PUBLICATIONS

Machine translation of JP-05323121-A (Year: 1993).*
U.S. Appl. No. 17/161,441 and its entire file history filed Jan. 28, 2021, Kiyono et al.

*Primary Examiner* — Yuqing Xiao
*Assistant Examiner* — Zhengqing Qi
(74) *Attorney, Agent, or Firm* — Maschoff Brennan

(57) ABSTRACT

An optical detector includes a light emitter having a light emitting window extended in an extension direction to emit a projection beam from the light emitting window toward a measurement area and to detect a return beam from the measurement area. The optical detector includes a scanning mirror that scans by reflecting the projection beam. The scanning mirror swings within a finite angular range around a rotation axis that is along a direction corresponding to the extension direction.

17 Claims, 7 Drawing Sheets

(56) References Cited

U.S. PATENT DOCUMENTS

| | | | |
|---|---|---|---|
| 2018/0094793 A1 | 4/2018 | Yokota et al. | |
| 2018/0120441 A1* | 5/2018 | Elooz | G01S 7/484 |
| 2018/0329060 A1* | 11/2018 | Pacala | H01L 31/02027 |
| 2019/0107607 A1 | 4/2019 | Danziger | |
| 2019/0107623 A1* | 4/2019 | Campbell | G01S 17/931 |
| 2019/0212419 A1* | 7/2019 | Jeong | G01S 17/08 |
| 2019/0257946 A1* | 8/2019 | Ando | G01S 17/08 |
| 2020/0064475 A1* | 2/2020 | Hibino | G01S 17/04 |
| 2020/0124708 A1* | 4/2020 | Gimpel | G01S 7/4816 |
| 2020/0182975 A1* | 6/2020 | Wang | G02B 27/30 |
| 2021/0165101 A1 | 6/2021 | Ikeoh et al. | |

FOREIGN PATENT DOCUMENTS

| | | | |
|---|---|---|---|
| JP | 05323121 A | * | 12/1993 |
| JP | 2013-130422 A | | 7/2013 |
| JP | 2017-20917 A | | 1/2017 |
| JP | 2019-095353 A | | 6/2019 |
| JP | 2019-095354 A | | 6/2019 |

* cited by examiner

OPTICAL DETECTOR

CROSS REFERENCE TO RELATED APPLICATION

This application is based on Japanese Patent Application No. 2020-015010 filed on Jan. 31, 2020, the disclosure of which is incorporated herein by reference in its entirety.

TECHNICAL FIELD

The present disclosure relates to an optical detector.

BACKGROUND

A scanning mirror of an optical detector scans a projection beam by rotating by 360 degrees. As a result, it is possible to detect 360 degrees circumference of the optical detector.

SUMMARY

According to an aspect of the present disclosure, an optical detector is configured to project a projection beam toward a measurement area and detect a return beam from the measurement area. The optical detector includes: a light emitter having a light emitting window extended in an extension direction to emit the projection beam from the light emitting window; and a scanning mirror that scans by reflecting the projection beam. The scanning mirror swings within a finite angular range around a rotation axis that is along a direction corresponding to the extension direction.

DESCRIPTION OF EMBODIMENTS

Figure 1:
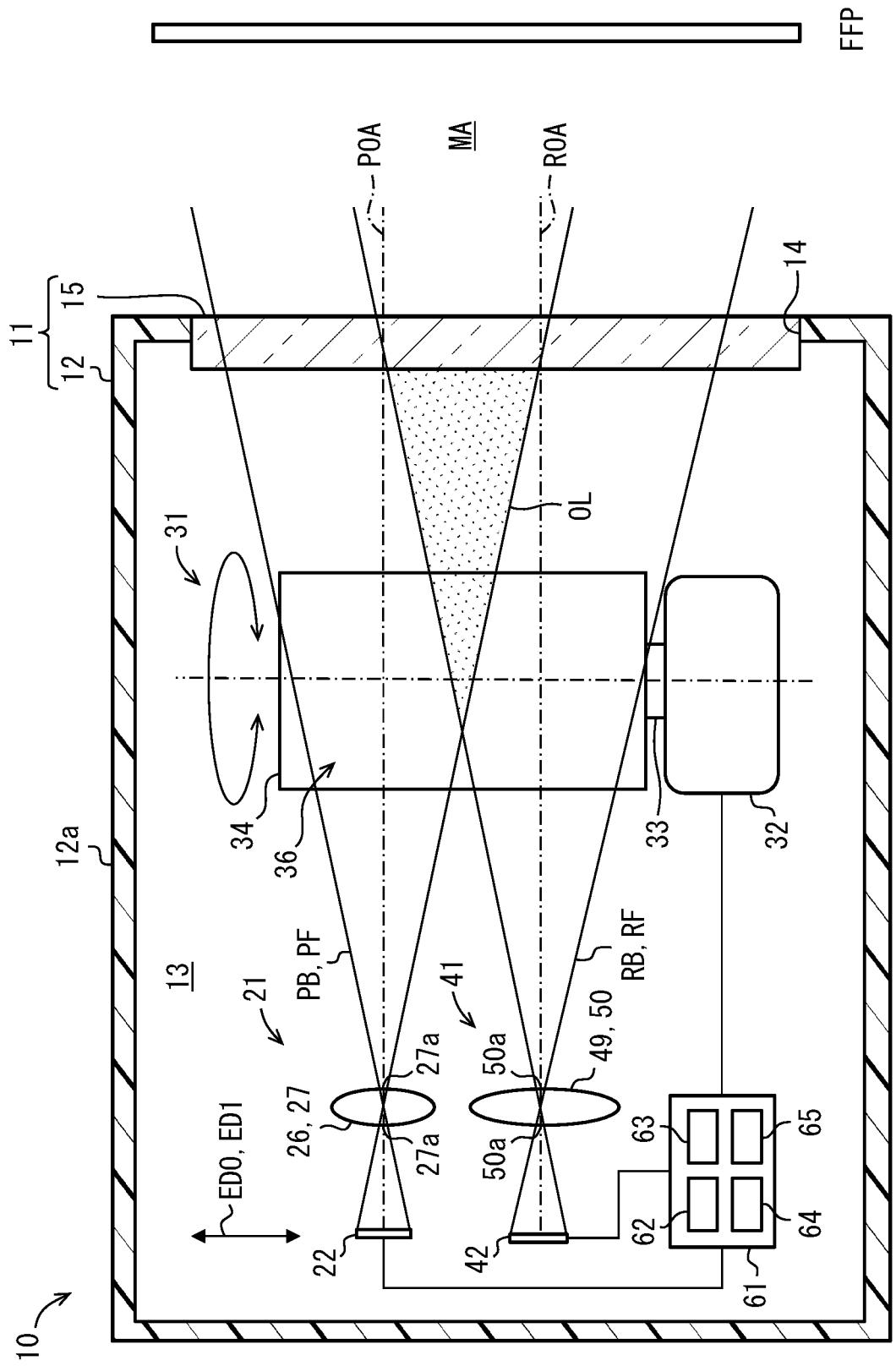
FIG. 1 is a diagram showing an overall configuration of an optical detector.

To begin with, examples of relevant techniques will be described.

A scanning mirror of an optical detector scans a projection beam by rotating by 360 degrees. As a result, it is possible to detect 360 degrees circumference of the optical detector.

However, a scan time may be wasted due to scanning to a region where detection or high detection accuracy is not required. Due to such waste, the irradiance of the projection beam becomes insufficient to a specific region for which detection or high detection accuracy is required. The detection accuracy may be low for a measurement target in the specific region.

The present disclosure provides an optical detector capable of realizing high detection accuracy.

According to an aspect of the present disclosure, an optical detector is configured to project a projection beam toward a measurement area and detect a return beam from the measurement area. The optical detector includes: a light emitter having a light emitting window extended in an extension direction to emit the projection beam from the light emitting window; and a scanning mirror that scans by reflecting the projection beam. The scanning mirror swings within a finite angular range around a rotation axis that is along a direction corresponding to the extension direction.

Accordingly, the scanning of the projection beam by the scanning mirror is realized by the swing motion within the finite angular range. Since the scanning to the area where the detection or the high detection accuracy is not required is regulated, it is possible to suppress the waste of the scanning time. Further, the light emitting window for emitting the projection beam has a shape elongated in the extension direction, and the rotation axis serving as a reference of the swing motion is provided along the extension direction. Therefore, a substantially long beam can be projected along the direction perpendicular to the swing motion with respect to a predetermined phase of the scanning mirror. That is, the scanning can be made more efficient, since the need for two-dimensional scanning including the extension direction is reduced. Thus, the irradiation of the projection beam can be concentrated on the specific region, and the irradiance can be increased. As a result, it is possible to provide an optical detector capable of realizing high detection accuracy.

It should be noted that the reference numerals are merely illustrative of the correspondence in the embodiments described below, and are not intended to limit the technical scope.

An embodiment will be described with reference to the drawings.

First Embodiment

As shown in FIG. 1, an optical detector 10 according to a first embodiment is a LiDAR (Light Detection and Ranging/Laser Imaging Detection and Ranging) to be mounted on a vehicle WC as a movable unit. For example, the optical detector 10 is arranged on a front portion, a left/right portion, a rear portion, or a roof of the vehicle WC. The optical detector 10 scans a projection beam PB toward a predetermined measurement area MA around the vehicle WC in an area outside the optical detector. The optical detector 10 detects a return beam (hereinafter, referred to as a reflected beam RB) which is the projection beam PB reflected by a measurement target. For the projection beam PB, light in the near-infrared region that is difficult for human beings to visually recognize is usually selected.

The optical detector 10 can measure the measurement target by detecting the reflected beam RB. The measurement of the measurement target is, for example, measurement of the distance from the optical detector 10 to the measurement target, the direction in which the measurement target is present, and the like. In the optical detector 10 applied to the vehicle WC, typical measurement targets are pedestrians, cyclists, animals other than humans, movable objects such as other vehicles, and stationary objects such as guardrails, road signs, roadside structures, and objects on the road.

In the present embodiment, unless otherwise specified, the front, rear, upper, lower, left, and right directions are defined with reference to the vehicle WC on the horizontal plane. Further, the horizontal direction indicates a tangential direction to the horizontal plane, and the vertical direction indicates a vertical direction to the horizontal plane.

The optical detector 10 includes a housing 11, a light projecting unit 21, a scanning unit 31, a light receiving unit 41, and a controller 61. The housing 11 has a light shielding container 12 and a cover plate 15, and forms an exterior part of the optical detector 10.

The light shielding container 12 is made of, for example, synthetic resin or metal, and is formed in a box shape having an outer wall 12a with a light shielding property. The light shielding container 12 may be configured by one component or may be configured by combining plural components. The light shielding container 12 includes a housing chamber 13 surrounded by the outer wall 12a to house the light projecting unit 21, the scanning unit 31, the light receiving unit 41, and the controller 61. The housing chamber 13 is commonly provided for the light projecting unit 21 and the light receiving unit 41, and one housing chamber is provided in the present embodiment. Since the housing chamber 13 is shared by the light projecting unit 21 and the light receiving unit 41, it is possible to eliminate a partition wall between the light projecting unit 21 and the light receiving unit 41. Thus, it is possible to suppress increase in the size of the optical detector 10.

The light shielding container 12 has an optical window 14, which is opened, through which both the projection beam PB and the reflected beam RB reciprocate between the housing chamber 13 and the measurement area MA. The optical window 14 is provided commonly to both the light projecting unit 21 and the light receiving unit 41, and one optical window is provided in the present embodiment.

The cover plate 15 is a member formed in a plate shape (for example, a flat plate shape) capable of transmitting both the beams PB and RB, and is made of a base material, for example, synthetic resin or glass. The cover plate 15 is arranged to cover the entire optical window 14, and blocks foreign substances from entering the housing chamber 13 from the outside.

The cover plate 15 transmits light in the near-infrared region by coloring the base material, forming an optical thin film, or attaching a film to the surface of the base material. Further, it is preferable to have wavelength dependency of transmittance that shields visible light, so as to prevent the inside of the housing chamber 13 from being seen from the outside. A mirror-like surface of the base material may be exposed from a surface of the cover plate 15 facing the housing chamber 13 and/or a surface of the cover plate 15 facing the measurement area MA. An antireflection film or moth-eye structure may be provided on the surface of the cover plate 15 facing the housing chamber 13 and/or the surface of the cover plate 15 facing the measurement area MA.

For example, the cover plate 15 may have a flat plate shape. In this case, the accuracy of detecting the position of the measurement target can be raised by suppressing an angle change caused by the refraction of the projection beam PB passing through the cover plate 15 and an angle change caused by the refraction of the reflected beam RB.

Figure 2:
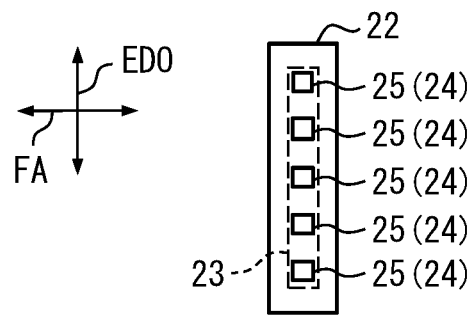
FIG. 2 is a diagram showing a light emitting portion.

The light projecting unit 21 includes a light emitting unit 22, a projecting optical system 26, and a projection holding member 28. As shown in FIG. 2, the light emitting unit 22 has plural laser oscillation elements 24 arranged in an array along the extension direction ED0 so as to form a light emitting window 23 elongated in the extension direction ED0. The light emitting unit 22 uses the plural laser oscillation elements 24 to increase the overall output of laser light. The light emitting unit 22 projects the projection beam PB from the light emitting window 23 at a light emission timing in response to the electric signal from the controller 61.

Each of the laser oscillation elements 24A may be, for example, laser diode (LD). Each of the laser oscillation elements 24 has a structure in which a P-type semiconductor and an N-type semiconductor are bonded to each other via a PN junction layer, and a resonator structure that resonates the light generated in the PN junction layer. In the resonator structure, the PN junction layer is arranged between mirrors, and one of the mirrors forms a half-mirror small window 25. Each of the laser oscillation elements 24 can emit laser light as coherent light in a beam state through the small window 25. This laser light is a small beam that forms a part of the projection beam PB. In the present embodiment, a group of beamlets oscillated from each of the windows 25 is defined as the projection beam PB. The PN junction layer of each laser oscillation element 24 is set along a direction perpendicular to the arrangement direction of the small windows 25 (that is, the extension direction ED0). An axis along the perpendicular direction is a fast axis FA of the laser diode.

The plural small windows 25 are arranged as close as possible to each other, to form the light emitting window 23 as a macroscopic opening formed by the aggregate of the small windows 25. The light emitting window 23 of the present embodiment has a substantially rectangular shape. The dimension of the light emitting window 23 in the extension direction ED0 is set to be, for example, 100 times or more larger than that in the direction perpendicular to the extension direction ED0 (the direction along the fast axis FA).

When the optical detector is mounted on a vehicle in a general form, the extension direction ED0 of the light emitting window 23 is along the vertical direction. The fast axis FA is along the horizontal direction when the optical detector is mounted on a vehicle.

Each of the laser oscillation elements 24 oscillates a linearly-polarized light in TE mode so that the polarization directions of the laser beams are common and along the extension direction ED0. Then, since the polarization direction of the projection beam PB is along the vertical direction in the vehicle mounted state, the projection beam PB can be incident on the road surface substantially along the horizontal direction with the perpendicularly polarization direction. Therefore, the regular reflectance is reduced, and the diffuse reflectance is increased. Thus, the reflected beam RB can be easily returned from the road surface to the optical window 14 when raining or freezing.

The projection beam PB is oscillated in a short pulse manner. The respective small beams emitted from each of the laser oscillation elements 24 may be oscillated substantially simultaneous, or may be sequentially oscillated with a slight time difference. The projection beam PB travels to the measurement area MA via the projecting optical system 26 and the scanning mirror 34 of the scanning unit 31.

The projecting optical system 26 collects and projects the projection beam PB emitted from the light emitting unit 22. The projecting optical system 26 is arranged between the light emitting unit 22 and the scanning mirror 34. The projecting optical system 26 includes at least one optical lens 27. The projecting optical system 26 forms a projection optical axis POA. The projection optical axis POA is defined as an axis, for example, along an imaginary ray passing through the center of curvature of the respective refracting surface of the optical lenses 27. The imaginary ray along the projection optical axis POA can pass through the projecting optical system 26 by going straight through each lens vertex 27a without being deflected. In this embodiment, the principal ray of the projection beam PB emitted from the center point of the light emitting window 23 is along the projection optical axis POA. When the center point of the light emitting window 23 is located in the gap between the small windows 25, the principal ray of the projection beam PB is an imaginary ray in optical design. When the light beam along the projection optical axis POA is deflected by the scanning unit 31, the projection optical axis POA is also defined as including an extended portion along the deflection direction.

Figure 3:
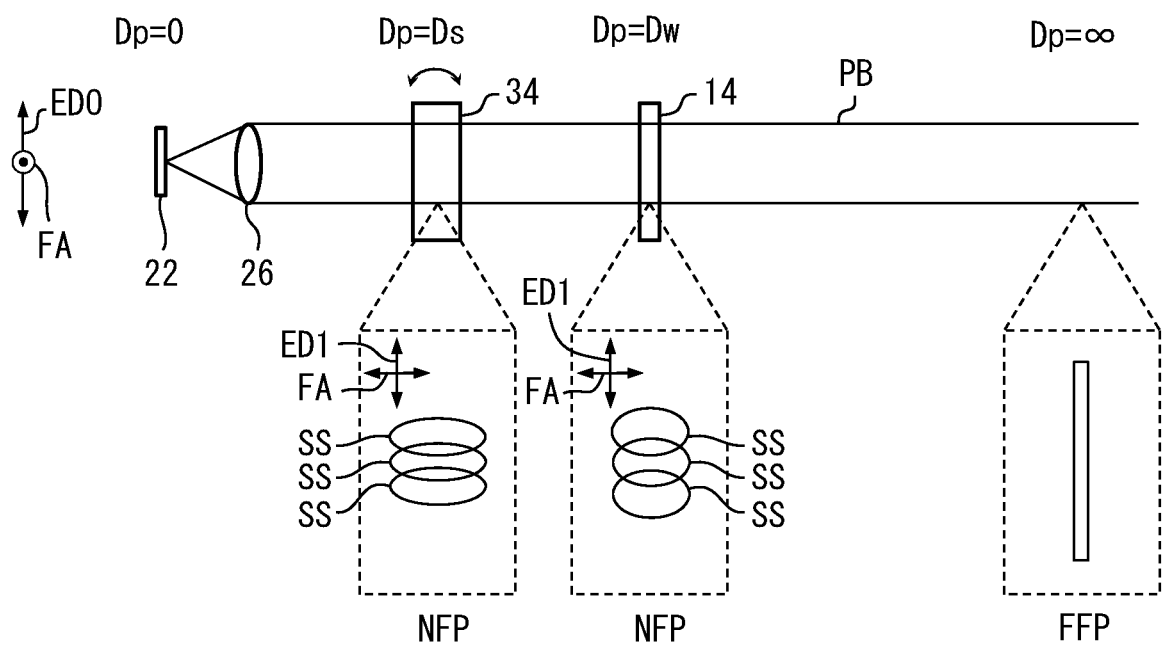
FIG. 3 is a diagram for explaining a spot shape of a projection beam.

The focal length of the projecting optical system 26 is substantially equal to the distance from the principal point of the projecting optical system 26 to the light emitting window 23 along the projection optical axis POA. As shown in FIG. 3, the projecting optical system 26 collimates the projection beam PB emitted from the light emitting window 23. The distance Dp from the light emitting window 23 along the projection optical axis POA is infinity at a position (Dp=∞) that is a point conjugate with the light emitting window 23, outside the housing chamber 13, on the opposite side of the light emitting window 23 through the projecting optical system 26 in the optical path. The spot shape of the projection beam PB at the infinity is a far field pattern FFP. An image corresponding to the light emitting window 23 is formed at the infinity, but this image is more affected by the diffraction in the extension direction ED0 than the near field pattern NFP. Therefore, the spot shape of the projection beam PB at the infinity has a line shape in which each small beam is elongated along the extension direction ED0, for example, while leaving the gap between the small windows in the light emitting window 23. Alternatively, the spot shape of the projection beam PB at the infinity has a line shape in which the small beams are integrated and elongated along the extension direction ED0, since the gap between the small windows 25 in the light emitting window 23 is substantially eliminated.

In the housing chamber 13 where the distance Dp from the light emitting window 23 is small, the spot shape of the projection beam PB is the near field pattern NFP. This spot shape is less affected by diffraction in the extending direction of the fast axis FA than the far field pattern FFP. The small spots SS corresponding to the respective small beams can be separately recognized in this spot shape. Each small spot SS has an elliptical pattern in which the fast axis FA corresponds to the long axis. The small spots SS may be completely separated from each other, or may be partially overlapped with each other.

The range of the footprint PF of the projection beam PB may be defined by the light emitting window 23 that functions as a substantial diaphragm, while the image formation mode is adjusted by the projecting optical system 26. The projection optical axis POA penetrates the center point of the light emitting window 23. Alternatively, the range of the footprint PF may be defined by disposing a diaphragm, in which the projection optical axis POA penetrates the center point, in the projecting optical system 26. The footprint in this embodiment means a space that can be covered by the trajectory of beam that contributes to the measurement.

Figure 4:
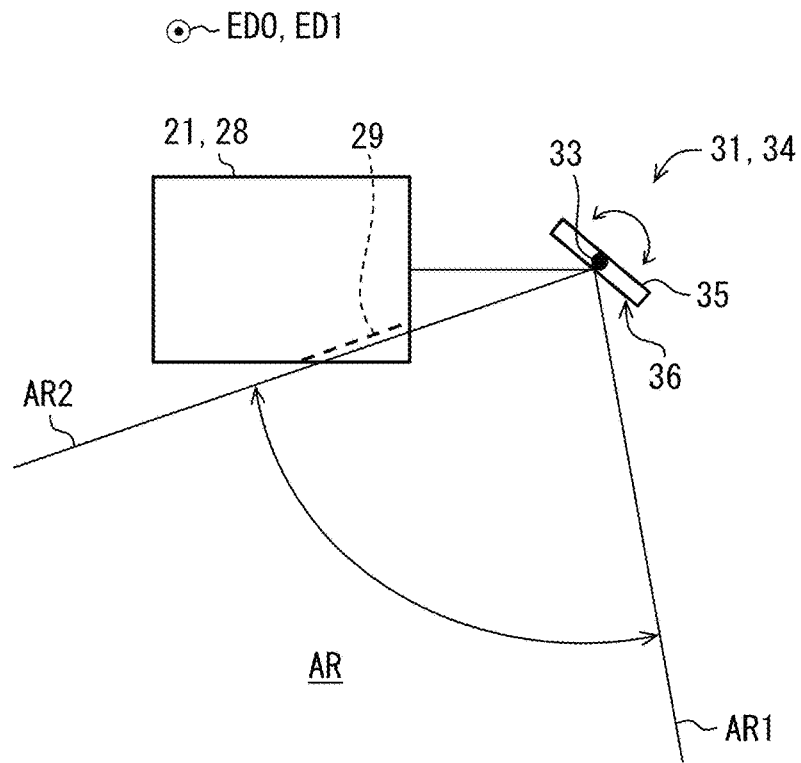
FIG. 4 is a diagram for explaining scanning by a scanning mirror.
Figure 5:
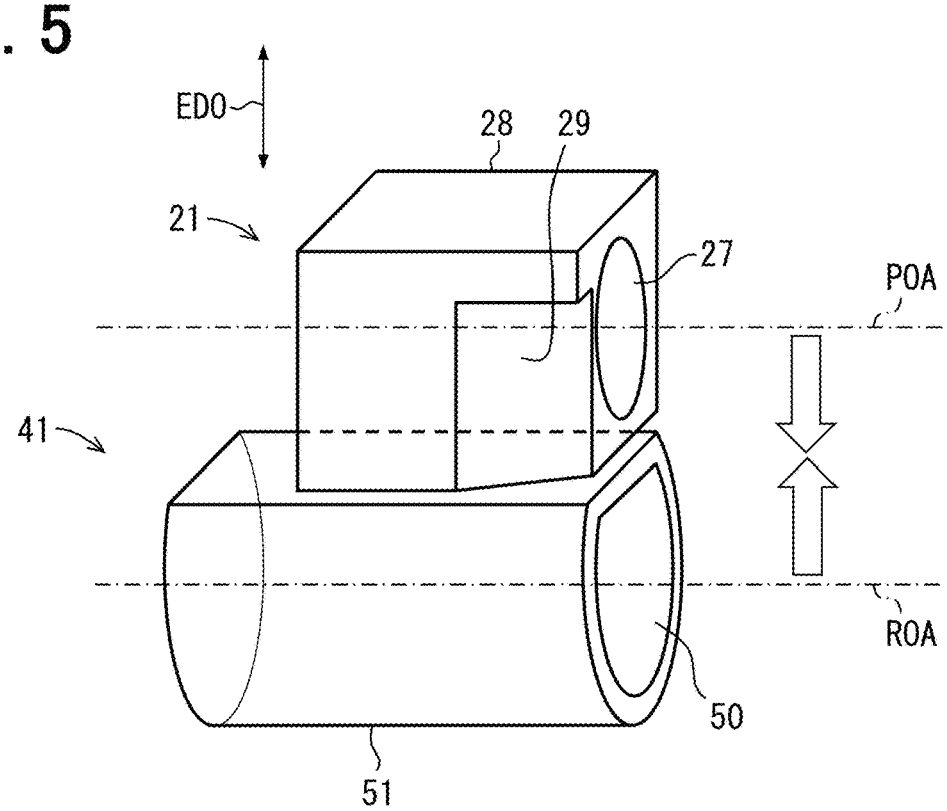
FIG. 5 is a diagram showing a positional relationship between a light projecting unit and a light receiving unit.

The projection holding member 28 shown in FIGS. 4 and 5 is formed in a tubular shape that holds one or more optical lenses 27 of the projecting optical system 26. The projection holding member 28 is formed of, for example, synthetic resin or metal so as to have a light-shielding property, as a lens barrel of the projecting optical system 26. The projection holding member 28 may be formed so as to further hold the light emitting unit 22.

As shown in FIGS. 1 and 4, the scanning unit 31 includes a drive motor 32, and a scanning mirror 34. The drive motor 32 may be, for example, a voice coil motor, a brushed DC motor, a stepping motor, or the like. The drive motor 32 drives the rotation shaft 33 mechanically coupled to the scanning mirror 34 with a rotation amount and a rotation speed in response to the electric signal from the controller 61. The rotation shaft 33 is arranged along an extension corresponding direction ED1 corresponding to the extension direction ED0 of the light emitting window 23. When the light emitting window 23 is virtually projected onto an object (for example, the reflecting surface 36 of the scanning mirror 34) on the optical path along the projection optical axis POA, the projection of the light emitting window 23 on the object (for example, on the reflecting surface 36) is along the extension corresponding direction ED1. In the present embodiment, the rotation shaft 33 substantially coincides with the extension direction ED0 of the light emitting window 23.

The scanning mirror 34 is capable of reflecting and scanning the projection beam PB. The scanning mirror 34 has a main body 35 and a reflecting surface 36. The scanning mirror 34 is mechanically coupled to the rotation shaft 33, and is formed in a flat plate made of, for example, synthetic resin. The reflecting surface 36 is formed into a mirror surface, for example, by depositing a metal film such as aluminum on one surface of the main body 35. The reflecting surface 36 is, for example, flat and extends along the direction parallel to the rotation shaft 33 so as to include the extension corresponding direction ED1.

The reflecting surface 36 is commonly provided for both of the beams PB and RB. The reflecting surface 36 is formed in a rectangular shape whose longitudinal direction substantially coincides with the extension corresponding direction ED1. As shown in FIG. 3, the reflecting surface 36 is arranged at a position (Dp=Ds) where the spot shape of the projection beam PB forms the near field pattern NFP. That is, each small spot SS of the projection beam PB on the reflecting surface 36 has an elliptical shape in which the extension corresponding direction ED1 correspond to the minor axis. Therefore, as compared with an aspect ratio of the light emitting window 23 having the elongated shape and the line-shaped spot at the infinity, the aspect ratio of the projection beam PB on the reflecting surface 36 is compressed in the extension corresponding direction ED1. Since the footprint PF of the projection beam PB is also compressed in the extension corresponding direction ED1, the dimension of the scanning mirror 34 in the extension corresponding direction ED1 is shortened.

As shown in FIG. 4, the scanning mirror 34 is capable of swinging within a finite angular range AR with reference to the rotation shaft 33 parallel to the extension corresponding direction ED1. The reflection angle of the projection beam PB reflected by the reflecting surface 36 also changes in accordance with the change in the orientation of the reflecting surface 36 due to the swing motion. The projection beam PB is temporally and spatially scanned toward the measurement area MA.

The scanning in this embodiment means one-dimensional scanning in which scanning in the extension corresponding direction ED1 is omitted. The spot shape of the projection beam PB reflected by the reflecting surface 36 at the infinity substantially corresponds to the illumination range of the projection beam PB in the phase of the swing motion. In the vehicle-mounted state, this illumination range is elongated in the vertical direction. Therefore, the vertical view angle in the measurement area MA can be widened even if the scanning mirror 34 does not perform scanning corresponding to the vertical direction.

The illumination range of the projection beam PB elongated in the vertical direction is moved by the swing motion along the direction perpendicular to the extension corresponding direction ED1, that is, along the horizontal direction. The finite angular range AR in the swing motion defines the horizontal view angle in the measurement area MA. A portion of the projection optical axis POA between the scanning mirror 34 and the measurement area MA swings along the horizontal direction according to the swing motion of the scanning mirror 34. However, the direction and position of the portion of the projection optical axis POA between the scanning mirror 34 and the measurement area MA is determined uniquely relative to a predetermined phase of the swing motion (in other words, a predetermined orientation of the reflecting surface 36).

The finite angular range AR is limited by a mechanical stopper, an electromagnetic stopper, or by controlling the drive mechanism. The reflection angle of the projection beam PB is the maximum at the end AR1 within the maximized finite angular range AR. The end AR1 is set such that the projection beam PB reflected by the scanning mirror 34 avoids deviating from the optical window 14 and the interference with the light shielding container 12.

The reflection angle of the projection beam PB is the minimum at the end AR2 within the maximized finite angular range AR. The end AR2 is set such that the projection beam PB reflected by the scanning mirror 34 is prevented from interfering with the light projection unit 21. The corner of the projection holding member 28 facing the optical window 14, where the projection beam PB is emitted, has a concave portion 29 recessed toward the projection optical axis POA that penetrates the projecting optical system 26. The footprint PF of the projection beam PB reflected by the scanning mirror 34 enters the space formed by the concave portion 29. As a result, the settable range of the end AR2 can be expanded where the reflection angle of the projection beam PB is the smallest within the finite angular range AR.

The projection beam PB scanned within the finite angular range AR passes through the optical window 14. As shown in FIG. 3, the optical window 14 is arranged at a position (Dp=Dw) where the spot shape of the projection beam PB forms the near field pattern NFP. That is, each small spot SS on the reflecting surface 36 of the projection beam PB has an ellipticity smaller than that on the reflecting surface 36 (that is, close to a circle), while the elliptical shape has the minor axis along the extension corresponding direction ED1. Therefore, the aspect ratio of the footprint PF of the projection beam PB on the optical window 14 is compressed in the extension corresponding direction ED1 as compared with the aspect ratio of the elongated emission window 23 and the line-shaped spot at the infinity. Thus, the dimension of the optical window 14 in the extension corresponding direction ED1 can be shortened.

The projection beam PB is transmitted through the optical window 14 and then reflected by the measurement target object existing in the measurement area MA. The reflected beam RB, which is the projection beam PB reflected by the measurement target object, again passes through the optical window 14 and enters the scanning mirror 34. The speeds of the projection beam PB and the reflected beam RB are sufficiently higher than the speed of the swing motion of the scanning mirror 34. Therefore, the difference between the phase of the swing motion when the projection beam PB is reflected by the scanning mirror 34 and the phase of the swing motion when the reflected beam RB is incident on the scanning mirror 34 is slight and can be ignored. Therefore, the reflected beam RB is reflected at substantially the same reflection angle as the projection beam PB, and is guided to the light receiving unit 41 so as to travel in the direction opposite to the projection beam PB.

Figure 6:
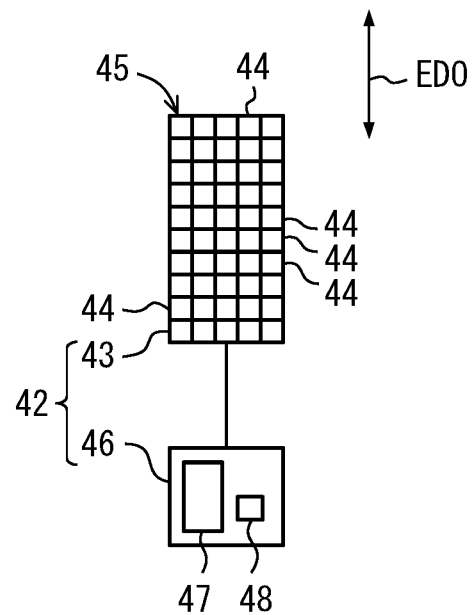
FIG. 6 is a diagram showing a configuration of a detection unit.

As shown in FIGS. 1 and 5, the light receiving unit 41 includes a detection unit 42, a receiving optical system 49, and a light receiving holding member 51. As shown in FIG. 6, the detection unit 42 in this embodiment has a light receiving element array 43 and a decoder 46. The light receiving element array 43 has plural light receiving elements 44 arranged in an array. As the light receiving element 44, a single photon avalanche photodiode (SPAD) light receiving element is adopted. The light receiving elements 44 are two-dimensionally arranged in a highly integrated state on the rectangular detection surface 45. Note that only some of the light receiving elements 44 shown in FIG. 6 are denoted by reference numerals.

The longitudinal direction of the detection surface 45 is aligned with the extension direction ED0 of the light emitting window 23. The reflected beam RB corresponding to the projection beam PB which is linear at the infinity can also be a linear beam. The detection surface 45 has a shape that matches the spread of the reflected beam RB. As a result, the detection unit 42 can efficiently receive the reflected beam RB, and the detection accuracy is improved.

When one or more photons are incident, each SPAD light receiving element 44 generates one electric pulse by an electron multiplying operation by avalanche doubling (so-called Geiger mode). That is, each light receiving element 44 can directly generate an electric pulse as a digital signal without using an AD conversion circuit from an analog signal to a digital signal. Therefore, the detection result of the reflected beam RB focused on the detection surface 45 via the receiving optical system 49 can be read at high speed.

The decoder 46 is provided to output the electric pulse generated by the light receiving element 44, and includes a selection circuit 47 and a clock oscillator 48. The selection circuit 47 is mounted in the form of, for example, an integrated circuit, and sequentially selects the light receiving element 44 from which the electric pulse is output, among the light receiving element array 43. The selected light receiving element 44 outputs an electric pulse to the controller 61. In this way, when the selection circuit 47 finishes selecting the light receiving element 44 to output once each, one sampling is completed. The selection circuit 47 periodically repeats sampling from a time when the projection beam PB is emitted at a predetermined emission timing. This sampling period corresponds to the clock frequency output from the clock oscillator 48. The clock oscillator 48 is provided inside or outside the integrated circuit of the selection circuit 47.

As shown in FIGS. 1 and 5, the receiving optical system 49 receives the reflected beam RB and focuses the reflected beam RB on the detection surface 45. The receiving optical system 49 is arranged between the detection unit 42 and the scanning mirror 34. The receiving optical system 49 includes one or more optical lenses 50. The diameter of the optical lens 50 of the receiving optical system 49 is made larger than the diameter of the optical lens 27 of the projecting optical system 26. In this way, the efficiency of collecting the reflected beam RB by the receiving optical system 49 can be improved. The receiving optical system 49 forms a receiving optical axis ROA. The receiving optical axis ROA is defined, for example, along an imaginary ray passing through the center of curvature of each refracting surface of one or more optical lenses 50. The imaginary ray along the receiving optical axis ROA can pass through the receiving optical system 49 by traveling straight through each lens vertex 50a without being deflected. In the present embodiment, the principal ray of the reflected beam RB that is incident on the center point of the detection surface 45 is along the receiving optical axis ROA. The principal ray of the reflected beam RB may be a virtual ray depending on the reflection mode of the projection beam PB by the measurement target object. When the light beam along the receiving optical axis ROA is deflected by the scanning unit 31, the receiving optical axis ROA is also defined as including an extended portion along the deflection direction.

A portion of the receiving optical axis ROA between the measurement area MA and the scanning mirror 34 swings along the horizontal direction in the vehicle mounted state in accordance with the swing motion of the scanning mirror 34. However, the direction and position of the portion of the receiving optical axis ROA between the measurement area MA and the scanning mirror 34 is uniquely determined with respect to a predetermined phase of the swing motion.

The range of the footprint RF of the reflected beam RB received by the receiving optical system 49 may be defined by the detection surface 45 functioning as a substantial diaphragm, while the receiving optical axis ROA penetrates the center point. Alternatively, the range of the footprint RF may be defined by disposing a diaphragm in the receiving optical system 49, while the receiving optical axis ROA penetrates the center point.

The light receiving holding member 51 shown in FIG. 5 is formed as a lens barrel of the receiving optical system 49. The light receiving holding member 51 is formed in a tubular shape for holding one or more optical lenses 50 of the receiving optical system 49, and is made of, for example, synthetic resin or metal so as to have a light-shielding property. The light receiving holding member 51 may be formed so as to further hold the detection unit 42.

As shown in FIGS. 1 and 5, the projection optical axis POA and the receiving optical axis ROA are offset from each other in the entire area inside the housing chamber 13 and outside the housing chamber 13. Specifically, the projection optical axis POA and the receiving optical axis ROA are arranged substantially parallel to each other with a space therebetween and along the common direction. The utilization efficiency of the projection beam PB and the reflected beam RB can be improved by arranging the projection optical axis POA and the receiving optical axis ROA along a direction perpendicular to the rotation shaft 33.

The positional relationship between the projection optical axis POA and the receiving optical axis ROA in an area between the measurement area MA and the scanning mirror 34 is also uniquely determined according to the orientation of the reflecting surface 36 common for the beams PB and RB. The mutually offset form (specifically, the parallel arrangement form) is maintained regardless of the phase of the swing motion.

The projecting optical system 26 and the receiving optical system 49 are arranged side by side in a direction along the rotation shaft 33 for the swing motion, that is, along the extension direction ED0 of the light emitting window 23. Then, the receiving optical system 49 can efficiently receive the reflected beam RB that is reflected by the common reflecting surface 36 at substantially the same reflection angle as the projection beam PB.

Due to the arrangement of the projecting optical system 26 and the receiving optical system 49, it is possible to suppress the projection beam PB from interfering with the light receiving holding member 51 and the reflected beam RB from interfering with the projection holding member 28. Further, as a result of adjusting the distance from the scanning mirror 34 to the projecting optical system 26 and the distance from the scanning mirror 34 to the receiving optical system 49, it is possible to reduce the size of the housing chamber 13 in the common direction along the optical axis POA, ROA.

In the vehicle mounted state, the receiving optical system 49 is arranged lower than the projecting optical system 26. Since the diameter of the optical lens 50 is larger than that of the optical lens 27 of the projecting optical system 26, the weight of the receiving optical system 49 or the light receiving unit 41 is larger than the weight of the projecting optical system 26 or the light projecting unit 21. Therefore, the center of gravity of the optical detector 10 can be lowered downward, and the installation stability of the optical detector 10 in a vehicle can be improved.

As shown in FIG. 1, the footprint PF of the projection beam PB increases the cross-sectional area perpendicular to the projection optical axis POA as going from the projecting optical system 26 toward the measurement area MA in the projection optical axis POA. Due to the scanning by the scanning mirror 34, the horizontal expansion width of the cross-sectional area of the footprint PF is increased in the area between the measurement area MA and the scanning mirror 34 relative to the area between the projecting optical system 26 and the scanning mirror 34.

Similarly, the footprint RF of the reflected beam RB increases the cross-sectional area perpendicular to the receiving optical axis ROA as going from the receiving optical system 49 toward the measurement area MA in the receiving optical axis ROA. Due to the scanning by the scanning mirror 34, the horizontal expansion width of the cross-sectional area of the footprint RF is increased in the area between the measurement area MA and the scanning mirror 34, relative to that in the area between the receiving optical system 49 and the scanning mirror 34. The horizontal expansion width means an increase in the horizontal direction in the cross-sectional area of the footprint per unit length along the optical axis.

An overlap OL in which the footprint PF of the projection beam PB and the footprint RF of the reflected beam RB overlap each other is formed inside the housing chamber 13. The size of the housing chamber 13 can be reduced by the volume of the overlap OL in the present embodiment in which the overlap OL is provided, compared with a comparison structure in which the footprints PF and RF are completely separated from each other.

In the present embodiment, the footprint PF of the projection beam PB and the footprint RF of the reflected beam RB partially overlap with each other on the reflecting surface 36 of the scanning mirror 34. Specifically, the footprints PF and RF overlap with each other on the cross section of the reflecting surface 36 including the direction along the rotation shaft 33. As a result, the dimension of the reflecting surface 36 along the extension corresponding direction ED1 can be reduced. Therefore, the size of the scanning mirror 34 or the housing chamber 13 can be reduced.

The controller 61 controls the measurement in the measurement area MA, and controls the swing motion of the scanning mirror 34. As shown in FIG. 1, the controller 61 has a computer including a processing unit 62, a RAM 63, a storage unit 64, an input/output interface 65, and a bus connecting them. The processing unit 62 is hardware for arithmetic processing and combined with the RAM 63. The processing unit 62 includes at least one arithmetic core such as a CPU (Central Processing Unit), a GPU (Graphical Processing Unit), and a RISC (Reduced Instruction Set Computer). The processing unit 62 may include at least one arithmetic core such as FPGA (Field-Programmable Gate Array) and ASIC (Application Specific Integrated Circuit). The processing unit 62 executes various processes for realizing the function of each functional unit described later by accessing the RAM 63. The storage unit 64 includes at least one non-volatile storage medium. A program executed by the processing unit 62 is stored in the storage unit 64.

Figure 7:
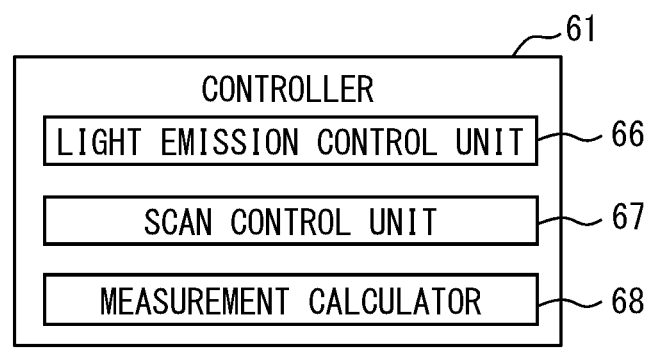
FIG. 7 is a block diagram showing a controller.

The controller 61 is electrically connected to or can wirelessly communicate with the light emitting unit 22, the drive motor 32, and the detection unit 42. As shown in FIG. 7, the controller 61 has functional units such as a light emission control unit 66, a scan control unit 67, and a measurement calculator 68.

The light emission control unit 66 outputs an electric signal to the light emitting unit 22 so that each laser oscillation element 24 emits the projection beam PB at a light emission timing associated with the scanning by the scanning mirror 34.

The scan control unit 67 outputs an electric signal to the drive motor 32 so that the scan associated with the light emission timing of the projection beam PB is realized. In the present embodiment, of the reciprocating movement in the swing motion within the finite angular range AR, the speed is precisely controlled in the forward path from the initial phase. In cooperation with such precise speed control, the light emission control unit 66 continuously emits the short-pulse projection beam PB, and the projection beam is scanned. In the returning path of the reciprocating movement, the scanning mirror 34 bounces back to the initial phase at a speed higher than that in the forward path. During this time period, the light emission control unit 66 stops emitting the projection beam PB. It is possible to reduce the necessity of changing the process between the forward path and the returning path of the swing motion in the measurement calculation of the measurement target object by performing the scanning of the projection beam PB in only one direction of the reciprocating movement. Thus, the process can be performed at high speed, or computer resources can be saved.

The scan control unit 67 causes the scanning mirror 34 to reciprocate continuously plural times in a short time. The projection beam PB is intensively emitted in each forward path.

Further, the scan control unit 67 of the controller 61 of the present embodiment can change the finite angular range AR and/or the speed HS, LS of the swing motion, for example, by storing a swing regulation parameter in the storage medium of the storage unit 64, such as a value of the angular range AR and a value of the speed HS, LS, or a parameter specifying an electric signal to the drive motor 32 for controlling the swing motion so as to satisfy these values. The scan control unit 67 reads the swing regulation parameter by accessing the storage unit 64, and controls the finite angular range AR and the speed HS, LS of the swing motion.

In the present embodiment, plural swing regulation parameters are stored in the storage unit 64, individually corresponding to the vehicle-mounted conditions of the optical detector 10. The scan control unit 67 selects an appropriate swing regulation parameter from the swing regulation parameters by reading out the setting information of the vehicle-mounted condition stored in the storage unit 64 or acquiring the setting information of the vehicle-mounted condition from an external device.

Figure 8:
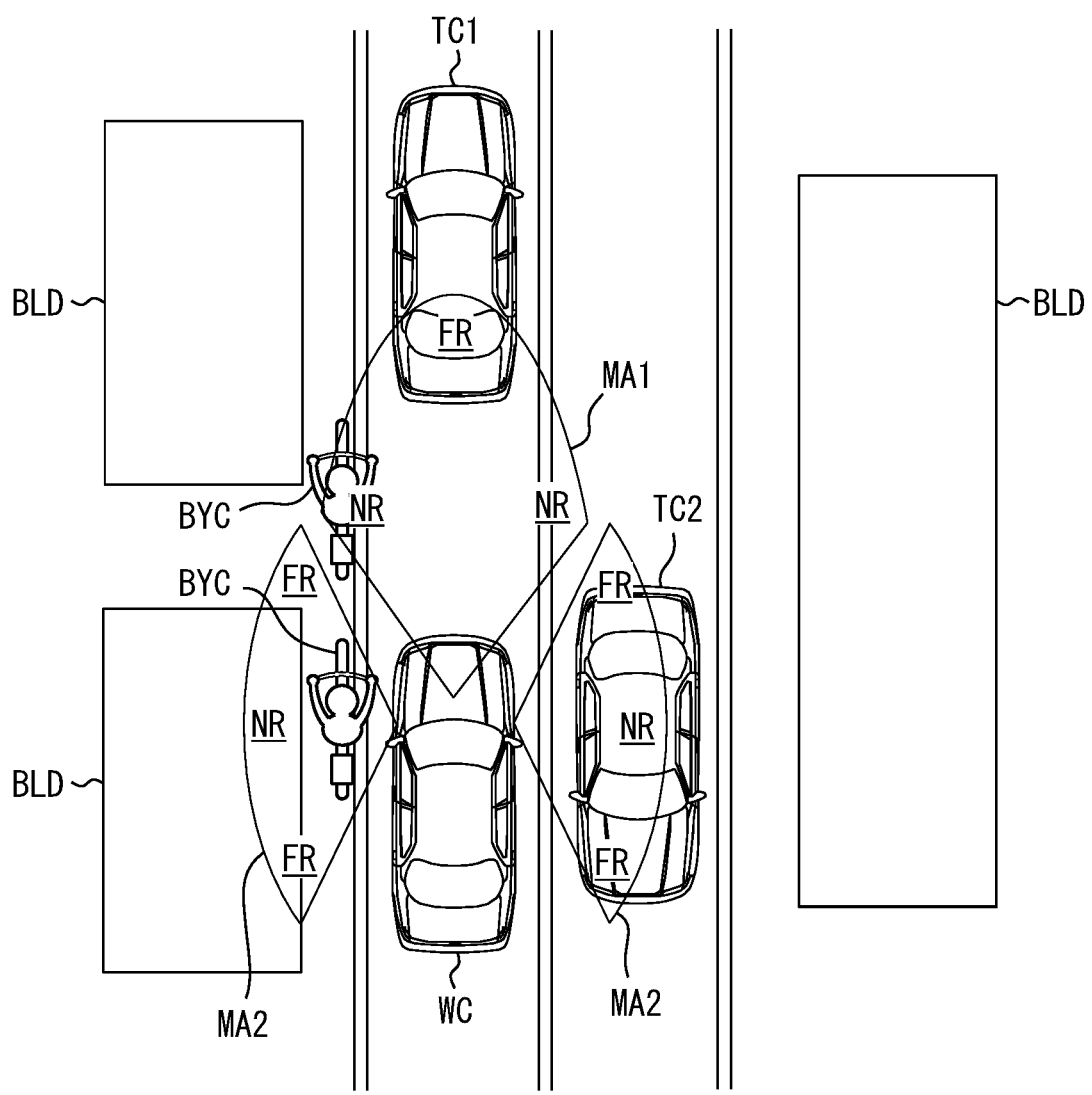
FIG. 8 is a bird's view illustrating a road and vehicles.

For example, as shown in FIG. 8, the measurement area MA1 may be defined front outside of the vehicle WC by the optical detector 10. Under this condition, the traveling lane of the vehicle WC corresponds to the central portion of the measurement area MA1 with high possibility. Therefore, a measurement accuracy is required at a relatively far range FR, for example, in order to measure the inter-vehicle distance relative to the other vehicle TC1 located on the front side. In the side portion of the measurement area MA1, a measurement accuracy is required at a relatively near range NR, for example, to measure the building BLD, the cyclist BYC, a pedestrian on the side of the road or another vehicle TC2 in the adjacent lane.

Figure 9:
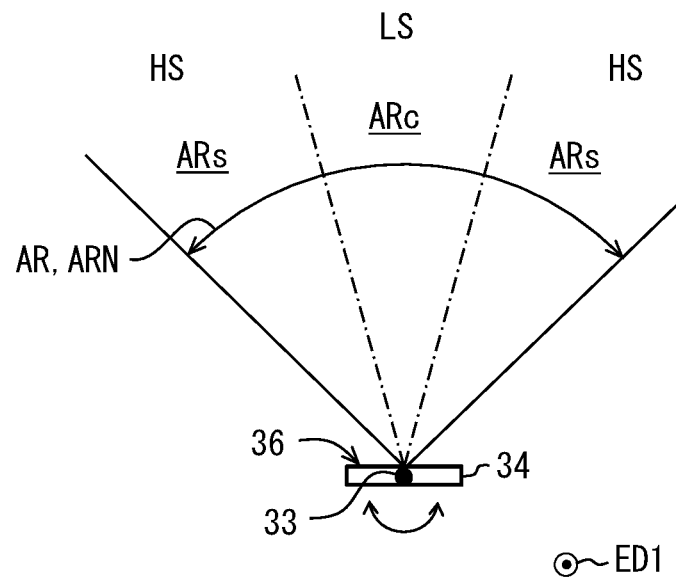
FIG. 9 is a diagram for explaining a swing motion when the measurement area is a front outside of the vehicle.

Under this vehicle-mounted condition, as shown in FIG. 9, the scan control unit 67 sets the speed LS of the swing motion lower in the central portion ARc of the finite angular range AR than the speed HS of the swing motion in the side portions ARs. Therefore, the retention time per unit angle in the swing motion is longer in the central portion ARc than in the side portions ARs. Then, it is possible to irradiate the projection beam PB with high irradiance (light density) to the angle corresponding to the central portion ARc by using the long retention time of the central portion ARc. Since the projection beam PB is sufficiently supplied to the far range FR in the central portion of the measurement area MA1, a sufficient amount of the reflected beam RB reflected on the far range FR and incident on the detection surface 45 is also obtained. Further, the scan control unit 67 may set the finite angular range AR to be a relatively narrow angular range ARN compared to a measurement area MA2 described later. The retention time per unit angle in the central portion ARc can be further lengthened.

In contrast, as shown in FIG. 8, the measurement area MA2 may be formed by the optical detector 10 lateral outside of the vehicle WC (for example, left outside or right outside). In this vehicle-mounted condition, in the central portion of the measurement area MA2, a measurement accuracy in a relatively near range NR is required, for example, in order to measure the building BLD adjacent to the road, the cyclist BYC, the pedestrian, and the other vehicle TC2 in the adjacent lane. The building BLD on the side of the road, the cyclist BYC, the pedestrian, or the other vehicle TC2 in the adjacent lane are the measurement target even in the side portion of the measurement area MA2. The measurement target is positioned diagonally forward or rearward in this case. Therefore, the measurement accuracy in the far range FR is relatively required.

Figure 10:
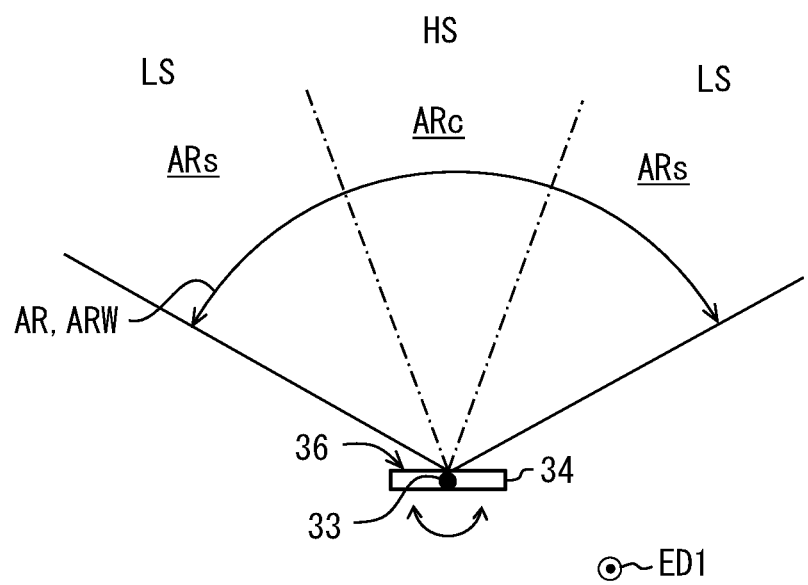
FIG. 10 is a diagram for explaining a swing motion when the measurement area is a lateral outside of the vehicle.

Under this vehicle-mounted condition, as shown in FIG. 10, the scan control unit 67 sets the speed LS of the swing motion higher in the central portion ARc of the finite angular range AR than the speed HS of the swing motion in the side portions ARs. Therefore, the retention time per unit angle in the swing motion is longer in the side portions ARs than in the central portion ARc. Then, it is possible to irradiate the projection beam PB with high irradiance (light density) to the angle corresponding to the side portion ARs by using the long retention time of the side portion ARs. Since the projection beam PB is sufficiently supplied to the far range FR in the side portion of the measurement area MA2, a sufficient amount of the reflected beam RB reflected by the far range FR and incident on the detection surface 45 can be obtained. Further, the scan control unit 67 may set the finite angular range AR to be a relatively wider angular range ARW than the measurement area MA1, because it is not necessary to measure a measurement target object located at a relatively far area lateral outside of the vehicle WC.

In the present embodiment, the side portion ARs is defined as a pair of areas in contact with both ends of the finite angular range AR, ARN, ARW divided into three equal areas. The central portion ARc is defined as an area sandwiched by the pair of side portions ARs of the finite angular range AR, ARN, ARW divided into three equal areas. The speed HS, LS is not limited to a constant speed and may be accelerated or decelerated. The comparison in the speed between the central portion ARc and the side portion ARs is a comparison between the average speed at the central portion ARc and the average speed at the side portion ARs. The retention time per unit angle in the swing motion may be standardized to a time period per cycle of the swing motion when the swing motion has a constant cycle. The retention time per unit angle in the swing motion may be an integrated time of the plural swing motions when the cycle varies among the plural swing motions.

The measurement calculator 68 performs arithmetic processing on the electric pulse input from the detection unit 42 to detect the presence/absence of the measurement target object in the measurement area MA and measure the distance to the measurement target object. The measurement calculator 68 counts the number of electric pulses output from each of the light receiving elements 44 in each sampling after the emission of the projection beam PB. The measurement calculator 68 generates a histogram in which the number of electric pulses for each sampling is recorded in each class. The class of this histogram shows the flight time of light from the emission of the projection beam PB to the incidence of the reflected beam RB on the light receiving element 44, that is, TOF (Time Of Flight). The sampling period by the decoder 46 corresponds to a time resolution in TOF measurement.

The measurement calculator 68 generates histograms for plural phase regions obtained by dividing the finite angular range AR in accordance with the reciprocating movement of the scanning mirror 34 and the emission of the projection beam PB on the forward path from the initial position. The histogram individually corresponding to each phase region is temporarily or non-temporarily stored in the RAM 63 or the storage unit 64.

In the present embodiment, the light emission control unit 66 emits the projection beam PB plural times at a periodic light emission timing while the scanning mirror 34 passes through one phase region in the forward path from the initial position of one swing motion. It is possible to increase the number of times of emission of the projection beam PB for the phase region in which the speed of the swing motion is low, compared to the phase region in which the speed is high.

In contrast, the measurement calculator 68 of the present embodiment integrates the histogram for each phase region with the electric pulse generated by the detection of the reflected beam RB corresponding to the plural emissions of the projection beam PB in each phase region. After the integration for the plural times, the measurement calculator 68 calculates the TOF corresponding to the class with the highest frequency in the histogram as the measurement result. The distance to the measurement target object can be specified by converting the TOF into a distance. The TOF measurement accuracy and the distance measurement accuracy can be improved by the integration for the plural times.

Figure 11:
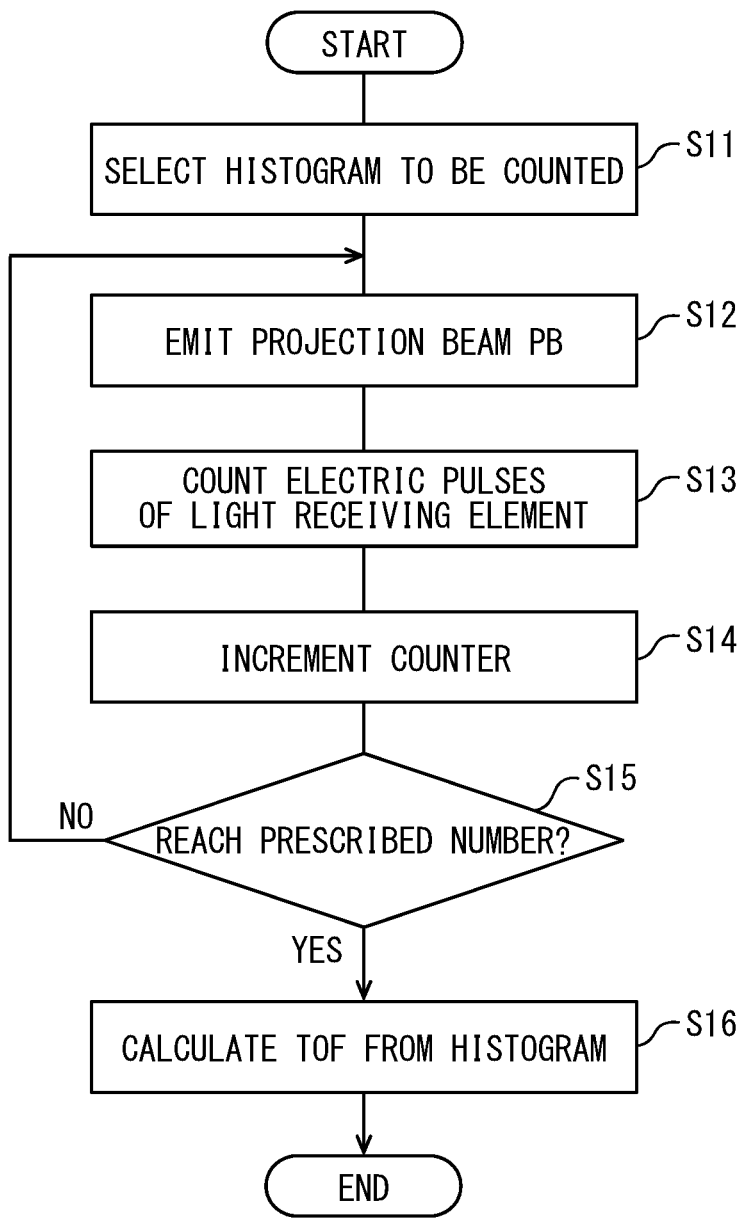
FIG. 11 is a flowchart executed by a decoder and the controller.

Next, the method of measuring the target object performed by the decoder 46 and the controller 61 will be described with reference to the flowchart of FIG. 11. The process configured by each step in the flowchart is performed, for example, every time the scanning mirror 34 passes through one phase region.

In S11, the measurement calculator 68 identifies the phase region into which the scanning mirror 34 has entered, and selects a histogram individually corresponding to the phase region, that is, a histogram to be integrated and counted. After the process in S11, the process shifts to S12.

In S12, the light emission control unit 66 causes the projection beam PB to emit. After the process in S12, the process shifts to S13.

In S13, the decoder 46 and the measurement calculator 68 count the electric pulses of the light receiving element 44. The count is not reset until the TOF is calculated, and is integrated. After the process in S13, the process shifts to S14.

In S14, the measurement calculator 68 increments the counter stored in, for example, the RAM 63 in order to count the number of times the projection beam PB is emitted. After the process in S14, the process shifts to S15.

In S15, the measurement calculator 68 determines whether the number of times the projection beam PB has been emitted reaches a prescribed number. The prescribed number is set corresponding to a transit time during which the scanning mirror 34 passes through the phase region under the measurement. When a negative determination is made in S15, the process returns to S12. When an affirmative determination is made in S15, the process proceeds to S16.

In S16, the measurement calculator 68 calculates the TOF from the histogram recording the integration result. Further, the TOF is converted into a distance, whereby the distance to the measurement target object is specified. A series of processing is ended after S16.

In the first embodiment, the decoder 46 of the detection unit 42 and the processing unit 62 of the controller 61 correspond to "at least one processor". Further, the cover plate 15 corresponds to a "cover member".

Operations and effects of the first embodiment will be described below.

According to the first embodiment, the scanning of the projection beam PB is realized by the swing motion of the scanning mirror 34 within the limited angular range AR. Since the scanning to the area where the detection or the high detection accuracy is not required is regulated, it is possible to suppress the waste of the scanning time. The light emitting window 23 for emitting the projection beam PB has a shape elongated in the extension direction ED0. The rotation shaft 33 serving as the reference of the swing motion is provided to extend in the direction ED1 along the extension direction ED0. Therefore, a substantially long beam can be projected along a direction perpendicular to the swing motion with respect to a predetermined phase of the scanning mirror 34. That is, since the necessity of two-dimensional scanning including the extension direction ED0 is reduced, the scanning is further efficient. As described above, the irradiation of the projection beam PB can be concentrated on the specific region, and the irradiance can be increased. As a result, it is possible to provide the optical detector 10 that can realize high detection accuracy.

Further, according to the first embodiment, the swing motion is controlled by the controller 61. Therefore, the projection beam PB can be scanned so as to achieve high detection accuracy.

Further, according to the first embodiment, the projection beam PB is emitted plural times while passing through at least one phase region of the plural phase regions obtained by dividing the finite angular range AR in the swing motion of the scanning mirror 34. The electric pulses are integrated by the plural emissions of the projection beam PB and the detection of the reflected beam RB corresponding to the plural emissions. Since the SPAD light receiving element 44 can generate an electronic pulse corresponding to the reception of a photon as a digital signal, the detections of the projection beams PB can be processed at high speed. Therefore, the integration of electric pulses can be performed within a passing time of a phase region where the measurement direction of the scanning mirror 34 can be regarded as the same, or in a time in which the movement of the measurement target object can be ignored. Since the TOF is calculated using such integration, the detection accuracy of the measurement target object can be improved.

Further, according to the first embodiment, the finite angular ranges AR, ARN, ARW is changeable. With such a change, it is possible to properly suppress the waste of the scanning time according to the usage environment. Therefore, the irradiation of the projection beam PB can be concentrated in a necessary area.

Further, according to the first embodiment, the speed HS, LS of the swing motion is changeable. With such a change, it is possible to exert appropriate detection accuracy for the specific area.

Further, according to the first embodiment, as the distance to the measurement target in the measurement area MA corresponding to the finite angular range AR is longer, the retention time per unit angle in the swing motion is set longer. It is possible to irradiate the projection beam PB with high irradiance by utilizing the long retention time at an angle where the distance to the measurement object is long. Therefore, it is possible to increase the amount of light which is irradiated to the measurement target existing at a long distance, and the amount of the reflected beam RB reflected from the measurement target to be detected. Therefore, the detection accuracy of the measurement target can be improved.

Further, according to the first embodiment, when the optical detector 10 is configured so that the measurement area MA1 corresponding to the angular range AR, ARN is located front outside of the vehicle WC, the retention time in the central portion ARc is longer than the retention time in the side portion ARs, within the finite angular range AR, ARN in the swing motion. Then, the other vehicle TC1 can be detected with high detection accuracy, for example, relative to the vehicle WC that tends to be relatively far from the other vehicle TC1.

Further, according to the first embodiment, in case where the optical detector 10 is configured so that the measurement area MA2 corresponding to the angular range AR, ARW is set laterally outside the vehicle WC, the retention time in the side portion ARs is set longer than the retention time in the central portion ARc, within the finite angular range AR, ARW in the swing motion. Then, the measurement object on the side of the road or the measurement object on the adjacent lane can be detected with appropriate detection accuracy according to the assumed distance.

Further, according to the first embodiment, the scanning mirror 34 has the reflecting surface 36 which is a common surface for reflecting the projection beam PB toward the measurement area MA and for reflecting the reflected beam RB from the measurement area MA. By making the reflecting surface 36 common, it is possible to detect the reflected beam RB that can be elongated in the shape in the extension direction ED0 without disturbing.

Further, according to the first embodiment, the projecting optical system 26 and the receiving optical system 49 are arranged side by side along the extension direction ED0. Both the collecting efficiency of the projection beam PB by the projecting optical system 26 and the collecting efficiency of the reflected beam RB by the receiving optical system 49 are optimized at the same time, while the projection beam PB and the reflection beam RB have the same reflection angle due to the swing motion with the common rotation shaft 33 as a reference, and the common reflecting surface 36. Therefore, a high gain can be obtained for the reflected beam RB to be detected with respect to the irradiance of the projection beam PB, and high detection accuracy can be realized.

Further, according to the first embodiment, the projection holding member 28 has the concave portion 29 recessed toward the projection optical axis POA in order to avoid interference with the projection beam PB reflected by the end AR2 where the reflection angle at the scanning mirror 34 is the smallest, of the ends AR1, AR2 of the finite angular range AR. Since the mechanical limit of the finite angular range AR can be expanded toward the end AR2 according to the volume of the space recessed by the concave portion 29, accurate scanning can be realized according to the usage environment.

Further, according to the first embodiment, the projection beam PB and the reflected beam RB have an overlap OL in which the footprints PF and RF overlap with each other inside the housing 11. The housing 11 can be downsized according to the volume of the overlap OL.

OTHER EMBODIMENTS

Although one embodiment has been described, the present disclosure should not be limited to the above embodiment and may be applied to various other embodiments within the scope of the present disclosure.

Specifically, as a first modification, the number of laser oscillation elements 24 in the light emitting unit 22 may be changed appropriately. That is, the number of small windows 25 in the light emitting window 23 may be appropriately changed, and may be one or more.

As a second modification, the light emitting unit 22 may be provided at plural positions. For example, the plural light emitting units 22 may be provided so that the light emitting windows 23 are arranged in the horizontal direction in the vehicle mounted state. One projecting optical system 26 may be provided for the plural light emitting units 22, or the same number of projecting optical systems 26 may be provided as the number of the light emitting units 22.

As a third modification, the focal length of the projecting optical system 26 is set such that the light emitting window 23 is imaged outside the housing chamber 13, and is not limited to the focal length to image the light emitting window 23 at the infinity.

As a fourth modification, the footprint PF of the projection beam PB and the footprint PF of the reflected beam RB may have the overlap OL only in the space inside the housing chamber 13 after the reflection by the scanning mirror 34. The footprint PF of the projection beam PB and the footprint PF of the reflected beam RB may have no overlap OL inside the housing chamber 13. In these cases, the reflecting surface 36 of the scanning mirror 34 may be provided separately for the beams PB and RB, or the scanning mirror 34 itself may be provided separately for the beams PB and RB.

As a fifth modification, the measurement calculator 68 does not have to reset the count of the electric pulse for one swing motion of the scanning mirror 34, and may continuously count the electric pulses for plural swing motions of the scanning mirror 34 to calculate the TOF.

As a sixth modification, the light receiving element 44 used in the detection unit 42 may be another light receiving element such as APD light receiving element instead of the SPAD light receiving element.

As a seventh modification, the projection beam PB may be emitted and scanned in correspondence with both the forward path and the backward path of the reciprocating swing motion within the finite angular range AR. In this case, the detection unit 42 may detect the reflected beam RB on both the forward path and the backward path. Further, the measurement calculator 68 may integrate and count the electric pulses by the reflected beam RB detected in the predetermined phase area on the forward path and the electric pulses by the reflected beam RB detected in the same phase area on the backward path into the same histogram, to calculate the TOF.

As an eighth modification, the measurement calculator 68 may calculate the TOF without using the histogram. For example, the TOF may be calculated from the average value of the timings at which electric pulses are detected.

As a ninth modification, the optical detector 10 may be configured such that the measurement area MA corresponding to the angular range AR, ARN is located rear outside of the vehicle WC. In this case, in the swing motion, the retention time in the central portion ARc of the finite angular range AR, ARN may be longer than the retention time in the side portion ARs.

As a tenth modification, the controller 61 may be provided outside the housing chamber 13. Further, the controller 61 may be configured as an electronic control device independent of the optical detector 10.

As an eleventh modification, a measurement calculation circuit may be provided in the detection unit 42. The calculation of the measurement calculator 68 of the controller 61 may be processed by the measurement calculation circuit of the detection unit 42. In this case, the histogram may be temporarily or permanently stored in the RAM 63 or the storage unit 64 of the controller 61. The detection unit 42 may further have a RAM or a non-volatile storage medium in addition to the measurement calculation circuit. In this case, the histogram may be temporarily or permanently stored in the RAM 63 or the storage medium of the detection unit 42. Further, the measurement calculation circuit may be separated from the selection circuit 47 of the decoder 46, or may be mounted as an integrated circuit common to the selection circuit 47.

The processor and the method described in the present disclosure may be realized by a processing unit of a dedicated computer programmed to execute one or a plurality of functions embodied by a computer program. Alternatively, the processor and the method described in the present disclosure may be realized by a dedicated hardware logic circuit. Further, the processor and the method thereof described in the present disclosure may be realized by a discrete circuit. Alternatively, the processor and the method described in the present disclosure may be any one selected from one or more processing units of a computer that executes a computer program, one or more hardware logic circuits, and one or more discrete circuits. It may be realized by a combination. The computer programs may be stored, as instructions to be executed by a computer, in a tangible non-transitory computer-readable medium.

What is claimed is:

1. An optical detector configured to project a projection beam toward a measurement area and detect a return beam from the measurement area, the optical detector comprising:
   a light emitter having a light emitting window extended in an extension direction to emit the projection beam from the light emitting window;
   a projecting optical system configured to collect and project the projection beam emitted from the light emitter; and
   a scanning mirror configured to receive the projection beam from the projecting optical system and scan by reflecting the projection beam, wherein the scanning mirror is configured to move within a finite angular range around a rotation axis that is along a direction corresponding to the extension direction;
   a receiving optical system configured to condense the return beam reflected by the scanning mirror in a detectable manner,
   a housing having an optical window to reciprocate the projection beam and the return beam between an inside of the housing and the measurement area, the housing forming an exterior part of the optical detector, wherein
   the projecting optical system and the receiving optical system are arranged side by side along the extension direction and parallel to the rotation axis, and
   the projection beam and the return beam have an overlap in which footprints are overlapped with each other inside of the housing,
   the optical detector further comprising
   a projection holding member that holds the projecting optical system, wherein
   the projection holding member has a concave portion recessed toward an optical axis of the projecting optical system to avoid interference with the projection beam reflected at an end of the angular range where a reflection angle at the scanning mirror is the minimum.

2. The optical detector according to claim 1, further comprising
   at least one processor to control a swing motion of the scanning mirror.

3. The optical detector according to claim 2, further comprising
   a single photon avalanche photodiode light receiving element that generates an electric pulse as a digital signal in response to a reception of a photon by the return beam, wherein the angular range is divided into a plurality of phase regions in the swing motion of the scanning mirror,
   the at least one processor causes the projection beam to emit plural times while passing through at least one phase region of the plurality of phase regions, and
   the at least one processor integrates the electric pulses generated by a detection of the projection beam and the return beam corresponding to the emission of the projection beam so as to calculate a flight time of light from the emission to the detection.

4. The optical detector according to claim 2, wherein the at least one processor is able to change the angular range.

5. The optical detector according to claim 2, wherein the at least one processor is able to change a speed of the swing motion.

6. The optical detector according to claim 2, wherein
the at least one processor lengthens a retention time per unit angle in the swing motion as the angular range corresponds to a farther region where a distance to a measurement target in the measurement area is farther.

7. The optical detector according to claim 2 for a vehicle, wherein
the measurement area corresponding to the angular range is located front outside or rear outside of the vehicle, and
the at least one processor sets a retention time per unit angle in the swing motion longer in a central part of the angular range than in a side part of the angular range.

8. The optical detector according to claim 2 for a vehicle, wherein
the measurement area corresponding to the angular range is located lateral outside of the vehicle, and
the at least one processor sets a retention time per unit angle in the swing motion longer in a side part of the angular range than in a central part of the angular range.

9. The optical detector according to claim 1, wherein
the scanning mirror has a reflecting surface that is common for reflecting the projection beam toward the measurement area and for reflecting the return beam from the measurement area.

10. The optical detector according to claim 1, further comprising:
a detection unit configured to detect the return beam condensed by the receiving optical system, wherein
the light emitter and the detection unit are arranged side by side along the extension direction and parallel to the rotation axis.

11. The optical detector according to claim 10, wherein
a projection optical axis of the projecting optical system from the light emitter to the scanning mirror is parallel to a receiving optical axis of the receiving optical system from the light emitter to the detection unit.

12. The optical detector according to claim 1, wherein
the projecting optical system consists of an optical lens.

13. The optical detector according to claim 12, wherein
the receiving optical system consists of an optical lens, and
a diameter of the optical lens of the receiving optical system is larger than a diameter of the optical lens of the projecting optical system.

14. The optical detector according to claim 1, wherein
a focal length of the projecting optical system is set such that an image corresponding to the light emitting window is formed at a position outside of the housing.

15. The optical detector according to claim 1, wherein
the scanning mirror is located at a distance from the light emitting window such that an aspect ratio of a footprint of the projection beam on a reflecting surface of the scanning mirror is compressed in the extension direction.

16. The optical detector according to claim 15, wherein
the light emitter has a plurality of small windows and a plurality of laser oscillation elements arranged in the extension direction that is parallel to the rotation axis, and
each of the plurality of laser oscillation elements emits laser light as coherent light in a beam state through the respective window of the plurality of small windows to form the projection beam.

17. The optical detector according to claim 16, wherein
the aspect ratio of the light emitting window is determined by the plurality of laser oscillation elements arranged in the extension direction.

* * * * *